United States Patent
Bouvier et al.

(10) Patent No.: US 12,241,485 B2
(45) Date of Patent: Mar. 4, 2025

(54) VALVE FOR DIVIDING A HYDRAULIC CIRCUIT AND HYDRAULIC CIRCUIT COMPRISING SAID VALVE

(71) Applicant: Airbus Operations S.L.U., Getafe (ES)

(72) Inventors: Benjamin Bouvier, Getafe (ES); Pablo Manuel Calderon Gomez, Getafe (ES)

(73) Assignee: Airbus Operations S.L.U., Getafe (ES)

( * ) Notice: Subject to any disclaimer, the term of this patent is extended or adjusted under 35 U.S.C. 154(b) by 137 days.

(21) Appl. No.: 18/072,849

(22) Filed: Dec. 1, 2022

(65) Prior Publication Data
US 2023/0175532 A1 Jun. 8, 2023

(30) Foreign Application Priority Data
Dec. 3, 2021 (EP) ..................................... 21383094

(51) Int. Cl.
| | | |
|---|---|---|
| *F15B 13/02* | (2006.01) | |
| *B64D 37/34* | (2006.01) | |
| *F15B 13/04* | (2006.01) | |
| *F15B 21/042* | (2019.01) | |
| *F16K 11/065* | (2006.01) | |
| *F16K 11/085* | (2006.01) | |

(52) U.S. Cl.
CPC .......... *F15B 13/0401* (2013.01); *B64D 37/34* (2013.01); *F15B 13/02* (2013.01); *F15B 21/042* (2013.01); *F16K 11/0655* (2013.01); *F16K 11/0856* (2013.01)

(58) Field of Classification Search
CPC ........ F15B 13/02; F15B 21/042; B64D 37/34; F16K 11/0655; F16K 11/0856
See application file for complete search history.

(56) References Cited

U.S. PATENT DOCUMENTS

| | | | | |
|---|---|---|---|---|
| 1,422,178 A | * | 7/1922 | Cooley | ............... F16K 11/0853 251/297 |
| 2,523,521 A | | 9/1950 | Ritter | |
| 2,865,399 A | * | 12/1958 | Majneri | .................. F15B 13/02 137/563 |
| 2,979,079 A | * | 4/1961 | Turak | .................. F16K 11/0856 137/599.08 |
| 3,411,538 A | * | 11/1968 | Gruner | ................ F16K 11/0716 137/625.29 |
| 4,574,840 A | * | 3/1986 | Schumann | .......... F16K 11/0856 137/625.46 |

(Continued)

FOREIGN PATENT DOCUMENTS

| | | |
|---|---|---|
| JP | 2008286452 A | 11/2008 |
| WO | 2020039889 A1 | 2/2020 |

OTHER PUBLICATIONS

European Search Report dated May 25, 2022; priority document.

*Primary Examiner* — Craig M Schneider
*Assistant Examiner* — Christopher D Ballman
(74) *Attorney, Agent, or Firm* — Greer, Burns & Crain, Ltd.

(57) ABSTRACT

A valve for a hydraulic circuit for an aircraft, the valve being configured to unite or separate multiple circuit portions in at least two configurations. More particularly, the valve allows to create one hydraulic circuit or two independent hydraulic circuits in order to circulate a coolant in two distinct manners and thus to adapt the function of the hydraulic circuit to any of two distinct phases of the functioning of an engine of the aircraft.

14 Claims, 8 Drawing Sheets

(56) References Cited

U.S. PATENT DOCUMENTS

| | | | | |
|---|---|---|---|---|
| 5,529,758 | A | * | 6/1996 | Houston ............. F16K 11/0853 422/171 |
| 5,634,352 | A | | 6/1997 | Nagai et al. |
| 10,018,382 | B2 | * | 7/2018 | Song ..................... F16K 31/363 |
| 10,344,877 | B2 | * | 7/2019 | Roche ..................... B60L 1/003 |
| 10,845,099 | B2 | * | 11/2020 | Nishiyama ............. F25B 39/028 |
| 11,247,528 | B2 | * | 2/2022 | Han ...................... F16K 11/072 |
| 11,614,173 | B2 | * | 3/2023 | Kim ...................... F16K 31/061 137/625 |
| 11,719,350 | B2 | * | 8/2023 | Dragojlov ........... F16K 11/0876 137/625.19 |
| 11,773,990 | B2 | * | 10/2023 | Koch ................. F16K 11/0853 137/1 |
| 2004/0173510 | A1 | | 9/2004 | Jung |
| 2006/0118066 | A1 | * | 6/2006 | Martins ............... F16K 11/0856 123/41.08 |
| 2009/0113991 | A1 | * | 5/2009 | Saito ...................... G01N 30/06 73/31.07 |
| 2011/0185797 | A1 | * | 8/2011 | Sakai .................... G01N 30/20 73/61.43 |
| 2013/0255281 | A1 | * | 10/2013 | Bray .................. H05K 7/20372 62/62 |
| 2017/0067665 | A1 | * | 3/2017 | Whitmore ............. F16K 27/067 |
| 2020/0088098 | A1 | | 3/2020 | Roberge |
| 2021/0048233 | A1 | * | 2/2021 | Tanaka .................. F16K 11/074 |
| 2022/0333696 | A1 | * | 10/2022 | Kibune ............... F16K 11/0655 |

* cited by examiner

VALVE FOR DIVIDING A HYDRAULIC CIRCUIT AND HYDRAULIC CIRCUIT COMPRISING SAID VALVE

CROSS-REFERENCES TO RELATED APPLICATIONS

This application claims the benefit of the European patent application No. 21383094.6 filed on Dec. 3, 2021, the entire disclosures of which are incorporated herein by way of reference.

FIELD OF THE INVENTION

The invention relates to valve and a hydraulic circuit. The invention relates to a valve with multiple intake ports and multiple exhaust port allowing to divide a hydraulic circuit into a plurality of circuit. The invention proposes a hydraulic circuit adapted to host a coolant for a specific purpose such as fluid temperature conditioning.

BACKGROUND OF THE INVENTION

The temperature conditioning of fluids such as gases or liquids is a topic of relevance in buildings and vehicles. In particular, in vehicles using di-hydrogen ($H_2$) as fuel, the $H_2$ is often stored in conditions of very low temperature but must be heated up to be used in an engine.

In aircraft, in particular, the weight of a system and its energy consumption are critical to the efficiency and fuel-burn of the aircraft. Therefore, when a source of heat is needed for a specific system or device, it is beneficial to harvest this heat from another portion of the aircraft that needs cooling. Calories must therefore be transported through sections of the aircraft in hydraulic circuits. These hydraulic circuits comprise many devices such as pumps and valves to ensure their functionalities with different requirements in different phases of a flights, as well as the safety of the aircraft.

Different types of valves are known which can achieve various functions, such as a three-way valve or a four-way valve. However, in some hydraulic circuits such as those that will be presented further in this text in connection with the invention, multiple valves would have to be used, with side effects such as high weight, high complexity, low reliability, etc.

SUMMARY OF THE INVENTION

The invention aims to provide a hydraulic circuit which provides flexibility in its use so as to be adapted to varying requirements at different instants.

The invention particularly aims to provide a hydraulic circuit for an aircraft that can deliver calories to a specific device in different flight phases.

The invention also aims to provide a valve that allows to divide a hydraulic circuit so as to adapt the hydraulic circuit to different functioning requirements.

The invention aims to provide a hydraulic circuit and a valve which are particularly reliable and safe.

The invention also aims to provide a hydraulic circuit and a valve that are simple to install and maintain.

The invention proposes a valve comprising:
a first intake port,
a first exhaust port,
a second intake port,
a second exhaust port,
a movable part adapted to be displaced between at least:
a first position, called a direct position, in which:
the first intake port is hydraulically connected to the first exhaust port by a first passageway, and
the second intake port is hydraulically connected to the second exhaust port by a second passageway,
and a second position, called a bypass position, characterized:
in that it further comprises:
a third intake port,
a third exhaust port,
and in that, with the movable part in bypass position:
the first intake port is hydraulically connected to the third exhaust port by a
third passageway, and
the third intake port is hydraulically connected to the second exhaust port by a fourth passageway.

A valve according to the invention is adapted to receive a coolant and to be mounted on a hydraulic circuit for a coolant. In the present text, the term coolant or cooling liquid refers to a liquid used to transfer heat from a device such as a heat exchanger to another device such as a heat exchanger, even if the main function of the circuit is to harvest heat.

The valve comprises a movable part and a fixed part. The movable part is movable with respect to the fixed part. The fixed part usually comprises the intake ports and exhaust ports as these ports are part of a bigger hydraulic circuit which is generally fixedly mounted, either in a building or in a vehicle. In the whole text the terms "bypass position" and "direct position" referring to a position of the movable part with respect to the fixed part of the valve will also be used to refer to the valve's state in a hydraulic circuit.

A valve of the invention allows to provide a hydraulic circuit with multiple configurations, each configuration corresponding to a position of the movable part of the valve. In particular, a valve of the invention allows to form a single hydraulic circuit by joining a first portion of hydraulic circuit to a second portion of hydraulic circuit, or to form two independent hydraulic circuits by the single displacement of one part.

Each passageway is adapted for a fluid to flow through the valve from an intake port to an exhaust port. A passageway according to the invention is within the valve. The passageway may comprise multiple conduit portions, some conduit portions being within the movable part and other conduit portions being within the fixed part. The bypass position and the direct position of the movable part correspond to relative positions of the movable part and the fixed part, in which conduits in the fixed part hydraulically connect with conduits in the movable part.

A valve according to the invention provides many benefits.

One of these benefits is that only one valve is needed to separate a main hydraulic circuit into two independent circuits. This limits the weight and costs of such circuit. The reliability of such hydraulic circuit is also very high because its good working depends on a limited number of valves.

Another benefit is that the length of hydraulic conduits which are not used in one or another of the configuration is limited compared to a circuit which would comprise optional conduits with traditional three-way or four-way valves.

A direct hydraulic connection between the first intake port and the second exhaust port allows to bypass completely a fluid flow between these two ports. It may allow, in particular, to close a first circuit portion on itself. In particular, such first circuit portion may comprise devices such as sensors, heat exchangers, valves or a pump for a fluid to continue to flow in this first circuit and, in particular, in the third passageway and fourth passageway from the first intake port to the second exhaust port. This first circuit is thus easily made independent from any other hydraulic circuit connected to the first exhaust port and/or the second intake port.

With the movable part in bypass position, the second intake port may be hydraulically connected to the first exhaust port by at least a fifth passageway.

A direct hydraulic connection between the second intake port and the first exhaust port allows to bypass completely a fluid flow between these two ports. It may allow in particular to close a second circuit portion on itself. In particular such second circuit portion may comprise devices such as sensors, heat exchangers, valves or a pump for a fluid to continue to flow in this second circuit and in particular in the fifth passageway directly from the second intake port to the first exhaust port. This second circuit is thus easily made independent from any other hydraulic circuit connected to the first intake port and/or the second exhaust port and/or the third intake port and/or the third exhaust port.

A valve according to the invention may be further characterized:
in that it comprises:
a fourth intake port,
a fourth exhaust port,
and in that, with the movable part in bypass position:
the second intake port is hydraulically connected to the fourth exhaust port by a fifth passageway, and
the fourth intake port is hydraulically connected to the first exhaust port by a sixth passageway.

In such configuration, the fluid of a circuit portion coming in through the second intake port may be redirected to another circuit portion through the fourth exhaust port. Similarly, a fluid from yet another hydraulic circuit may be injected through the fourth intake port into the circuit portion connected to the first exhaust port.

In cases in which the second intake port and the first exhaust port pertain to the same hydraulic circuit, these characteristics allow to deviate the fluid of this circuit to a circuit portion situated between the fourth exhaust port and the fourth intake port. Additional devices such as sensors, for example, may be mounted on this circuit portion so as to add functions to the hydraulic circuit portion flowing between the first exhaust port and the second intake port when the valve is in bypass position.

The movable part may comprise:
a first conduit adapted to form at least part of the first passageway in the direct position,
a second conduit adapted to form at least part of the second passageway in the direct position,
a third conduit adapted to form at least part of the third passageway in the bypass position,
a fourth conduit adapted to form at least part of the fourth passageway in the bypass position.

The valve may also comprise a fifth conduit adapted to form part of the fifth passageway in the bypass position.

In embodiments in which the valve also comprises a fourth intake port, the movable part also comprises a sixth conduit adapted to form part of the sixth passageway in the bypass position.

A valve according to the invention may further be adapted such that when displacing the movable part between the direct position and the bypass position, at least one passageway remains at least partially open for each intake port towards at least one exhaust port.

This allows a continuous transition between the two positions of the movable part, such that a fluid circulating in each of the hydraulic circuits connected by the valve will always have an open flow path. Thereby the fluid circulation is not temporarily stopped by the change of position of the movable part in the valve. Any hammer effect in the hydraulic circuit(s) or any other unstable system performance during or after the position change of the valve are thus avoided.

In order to do so, the dimensions of and the distance between the conduits of the movable part and the dimensions of conduits in the fixed part which open on an intake port or on an exhaust port are adapted such that, before a first of these conduits is completely closed to the fixed part conduit by the displacement of the movable part between a direct position and a bypass position, a second of these conduits in the movable part is at least partially open to the fixed part conduit. For example, a conduit portion in the fixed part of the valve opening on the valve's surface at the second intake port will come out:
on the second conduit in the direct position,
on the third conduit in the bypass position,
partially on the second conduit and partially on the third conduit in at least one intermediate position between the direct position and the bypass position.

Said otherwise, in this example, the opening of the second conduit and the opening of the third conduit overlap the opening of the fixed conduit in an intermediate position between the direct position and the bypass position.

The movable part may be passively maintained in a direct position, and actively actuated towards a bypass position.

By passively it is meant that no actuator needs to be continuously fed with energy to maintain the movable part's position.

Thereby the movable part of the valve is by default in a direct position. In a hydraulic circuit of the invention, this corresponds to a situation in which the coolant circulates from a heat harvesting heat exchanger to a heat providing heat exchanger. When an engine is stopped and cold, the coolant will harvest no heat at the heat harvesting heat exchanger, such that there will be no heat provided to the fuel line and the engine will not be able to start. Should the valve of the invention be failing before starting the engine, it will remain in the direct position and thus the engine will not be able to start. Thereby a safety is provided in which the engine will not start in case the valve has a defect.

On the contrary, should the valve fail while the engine is working, the hydraulic circuit will continue to ensure its function and the fuel will continue to be heated such that the engine will remain working.

The movable part may be maintained by default in a direct position by springs.

The movable part may be actuated by any known techniques such as an electrical actuator, a hydraulic actuator, a pneumatic actuator, etc.

The movable part may be movable by translation or by rotation around an axis with relation to the fixed part.

A valve according to the invention may further comprise a piston chamber adapted to receive a pressurized fluid so as to actuate the movable part.

The piston chamber may be adapted to receive a pressurized fluid so as to actuate the movable part. The movable part may be mounted as a rotating or translating piston in the fixed part, actuated by a pressurized fluid in the piston chamber. For example, in embodiments in which the movable part is by default in the direct position, the piston chamber may be adapted to receive a pressurized fluid which, above said predetermined pressure in the piston chamber, would displace the movable part towards the bypass position.

The movable part may thus be actuated by a hydraulic or pneumatic device.

The movable part may comprise a third predetermined position in which the first intake port, the second intake port, the first exhaust port and the second exhaust port may be hydraulically connected in a different manner than in the bypass position or in the direct position.

The movable part may comprise multiple sets of conduits adapted to connect the first intake port, the second intake port, the first exhaust port and the second exhaust port in various manners depending on its position. The number of predetermined positions each with a set of conduits is not limited to two or three and may be of more within the frame of this invention.

In the same way, the valve may comprise more than four intake ports and/or more than four exhaust ports.

Furthermore, the valve may comprise a sealing device between the movable part and the fixed part in order to avoid any fluid leak or mix of fluids between different hydraulic circuits. The sealing device may comprise one or more seals.

The movable part may comprise at least one functionalized conduit adapted to modify at least one characteristic of a flow of fluid in said functionalized conduit.

The flow of fluid may be only locally modified by the functionalized conduit, or may be modified in a longer portion of or in the whole hydraulic circuit of which it is part. The functionalized conduit may comprise a restrictor, a convergence portion, a divergence portion, etc.

The invention extends to a hydraulic circuit comprising at least one valve according to the invention.

A hydraulic circuit according to the invention may comprise one or more valve(s) according to the invention, with fluid conduits connected to the intake ports and exhaust ports of the valve(s). The hydraulic circuit may be adapted to conduct a cooling liquid—or coolant.

A hydraulic circuit according to the invention may comprise:
 a first hydraulic circuit portion, called a hot-side circuit:
 comprising at least one heat exchanger,
 connected to the first exhaust port and to the second intake port of the valve,
 a second hydraulic circuit portion, called a cold-side circuit:
 comprising at least one heat exchanger,
 connected to the first intake port and to the second exhaust port of the valve.

A hydraulic circuit according to the invention may comprise a hot-side circuit portion and a cold-side circuit portion. The hot-side circuit portion and the cold-side circuit portion are joined and form a main circuit when joined by the valve in the direct position. More particularly, the cold-side circuit may be connected to and extending between the first intake port and the second exhaust port of the valve, while the hot side circuit may be connected to and extending between the first exhaust port and the second intake port of the valve.

When the valve is in the bypass position the hot-side circuit portion and the cold-side circuit portion are segregated. For example, the cold-side circuit portion may be deviated to a bypass circuit portion, while the hot-side circuit portion may be directly bypassed so as to close on itself within the valve.

Thereby, in a hydraulic circuit according to the invention with a valve of the invention, a hydraulic circuit may be divided to form two independent hydraulic circuits by the single displacement of one part. This provides a particularly simple, reliable and light hydraulic circuit.

The hydraulic circuit comprises a bypass circuit portion between the third exhaust port and the third intake port.

More specifically, the hydraulic circuit may comprise a third circuit portion, called a bypass circuit, comprising a bypass pump and extending between the third exhaust port of the valve and the third intake port of the valve.

The bypass pump may be electrically actuated or otherwise provided.

The bypass pump is adapted to circulate a fluid in the bypass circuit from the third exhaust port towards the third intake port.

The bypass pump is situated on a circuit portion that is only used when the coolant is bypassed by the movable part in the bypass position.

A hydraulic circuit according to the invention may comprise a hydraulic actuating conduit extending from the bypass pump to the piston chamber of the valve.

In such embodiments of the invention, the simple activation of the bypass pump will both circulate the coolant in the bypass circuit—and thereby in the hydraulic circuit connected through the valve to the bypass circuit (for example the cold-side circuit)—and in the movable part of the valve towards a bypass position.

Alternatively, another actuating device may be activated simultaneously or slightly beforehand the bypass pump, for example by a same controller.

A hydraulic circuit according to the invention may comprise a heating device on the bypass circuit.

The heating device may be of different types. It may for example be a heat exchanger, an electrical heating device, etc. Beneficially in an aircraft of the invention, the heating device is an electrical heating device. Such device would only be used in phases of starting the engine.

In some embodiments, the bypass circuit may comprise a heating device without a pump.

The invention also extends to an aircraft comprising at least one hydraulic circuit according to the invention. In particular the invention extends to an aircraft comprising one or more hydraulic circuit with one or more valve according to the invention.

In an aircraft according to the invention, a heat exchanger of the hot-side circuit may be mounted on an engine exhaust so as to harvest waste heat from the exhaust. For example, the engine may be an auxiliary power unit (APU).

Similarly, the heat exchanger of the cold-side circuit may be mounted on the same engine's fuel line, so as to condition—in particular to heat up—a fuel before feeding it to the engine. This would allow to heat up $H_2$ from cryogenic conditions in a tank to a temperature and state that would facilitate its burn in the engine.

The invention also extends to other possible combinations of features described in the above description and in the following description relative to the figures. In particular, the invention extends to valves comprising features described in relation to the hydraulic circuit and/or the aircraft; the invention extends to hydraulic circuits comprising features described in relation to the valve and/or the aircraft; the invention extends to aircraft comprising features described in relation to the valve and/or the hydraulic circuit.

BRIEF DESCRIPTION OF THE DRAWINGS

Some specific exemplary embodiments and aspects of the invention are described in the following description in reference to the accompanying figures.

DETAILED DESCRIPTION OF THE PREFERRED EMBODIMENTS

Figure 1:
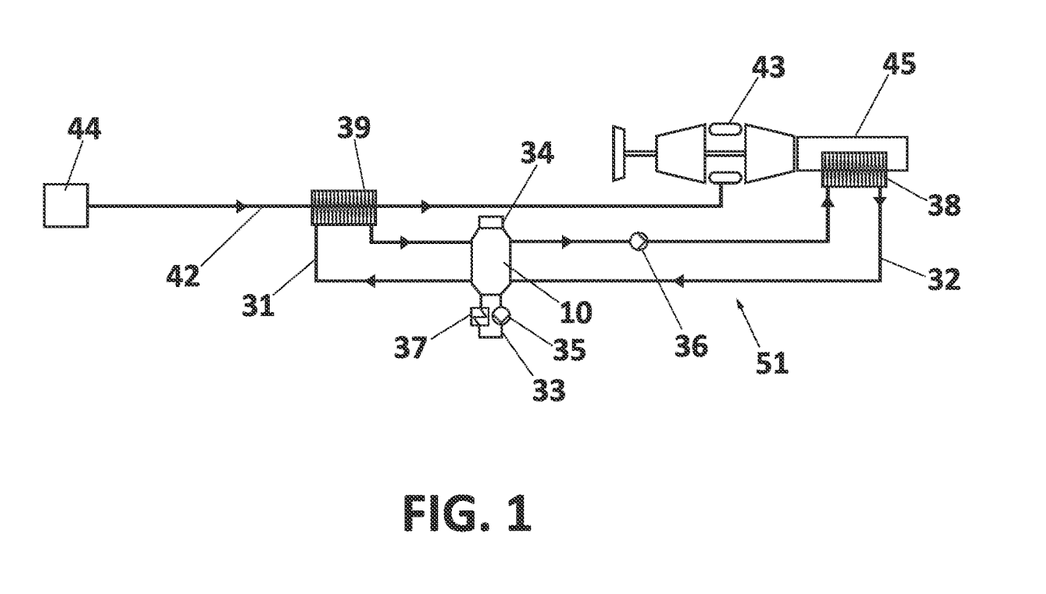
FIG. 1 is a schematic representation of an embodiment of a hydraulic circuit according to the invention.

In FIG. 1 a specific embodiment of a hydraulic circuit 51 according to the invention is represented in its context in an aircraft.

This hydraulic circuit 51 is made to transport a heat-transfer fluid, or cooling liquid or coolant.

Figure 14:
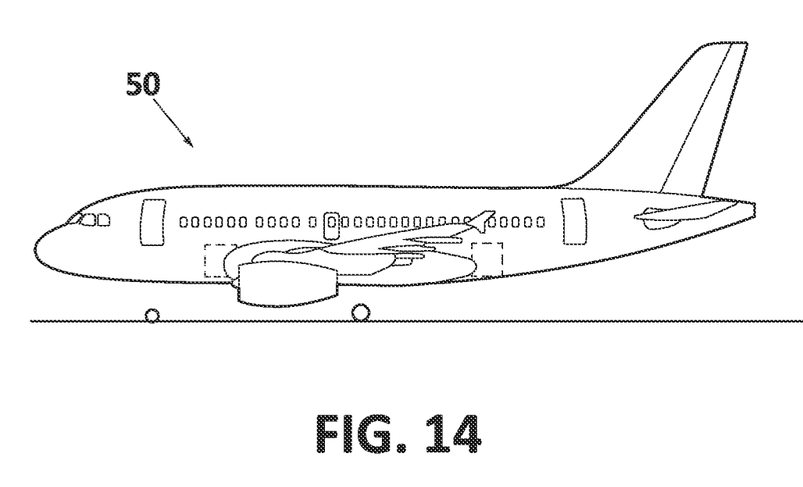
FIG. 14 is a side view of an aircraft embodying the present invention.

This hydraulic circuit may be mounted in an aircraft 50 of the type represented in FIG. 14. In this embodiment represented in FIG. 1, the aircraft 50 comprises an engine with an exhaust nozzle or exhaust pipe 45 for exhausting combusted gases out of a combustion chamber 43 of the engine. The engine is at least partially fueled by a fuel stored in a tank 44 of the aircraft. The fuel is fed to the engine from the fuel tank 44 through a hydraulic circuit for fuel or fuel line 42. The fuel line 42 may comprise multiple devices not represented here such as pumps, valves, branches, compressors, etc.

The fuel may be di-hydrogen ($H_2$). in order to be stored in fuel tanks 44 of reasonable size for an aircraft, that is to say to reach an energy density compatible with its transport on-board an aircraft as its energy source, the $H_2$ must be stored at very low temperatures at which it is liquid. However, to burn in an aircraft engine the fuel must be heated up.

Figure 2:
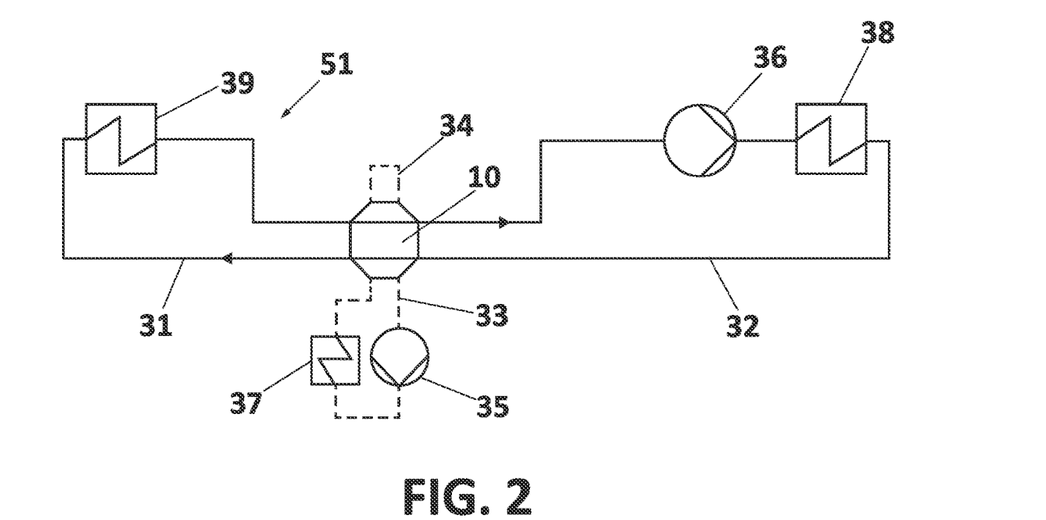
FIG. 2 is a schematic representation of a hydraulic circuit according to the invention in a first configuration.
Figure 4:
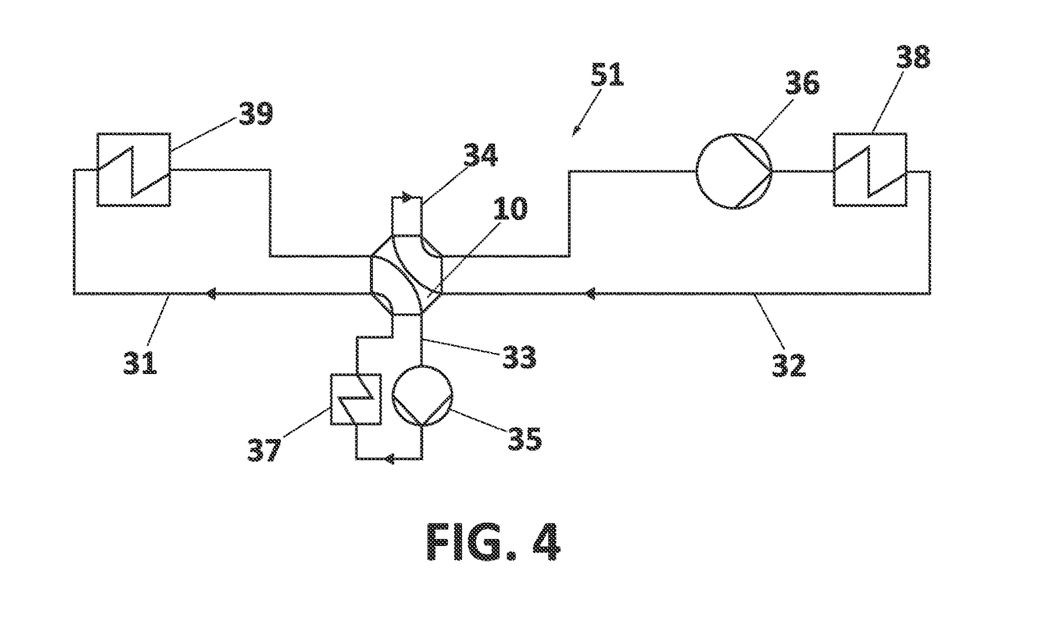
FIG. 4 is a schematic representation of is a schematic representation of a hydraulic circuit corresponding to FIG. 2 in a second configuration.

In FIGS. 2 and 4 the same hydraulic circuit is represented, this time only with the hydraulic circuit object of the invention and in a more schematic representation.

In particular, this embodiment of a hydraulic circuit 51 according to the invention comprises a first heat exchanger 38 situated at the exhaust pipe 45 so as to be able to harvest calories from hot combusted gases flowing through the exhaust pipe 45 when the engine is running.

The hydraulic circuit 51 comprises a second heat exchanger 39 adapted to deliver calories to a fuel in a fuel line 42.

In other embodiments, the hydraulic circuit 51 may comprise more than two heat exchangers. For example, it may comprise two successive heat exchangers on the fuel line so as to warm up the fuel in two stages.

The hydraulic circuit 51 comprises multiple conduits forming multiple hydraulic circuit portions 31, 32, 33, 34. The hydraulic circuit portions 31, 32, 33, 34 are all connected to and extend between intake ports 11, 13, 15, 17 and exhaust ports 12, 14, 16, 18 of a valve 10 according to the invention.

A first hydraulic circuit portion, called a hot-side circuit 32, comprises the first heat exchanger 38 and a pump 36 adapted to circulate the coolant in the hydraulic circuit 51. One side of the hot-side circuit 32 is connected to a first exhaust port 12 of the valve 10, and another side of the hot-side circuit 32 is connected to a second intake port 13 of the valve 10.

A second hydraulic circuit portion, called a cold-side circuit 31, comprises the second heat exchanger 39. One side of the cold-side circuit 31 is connected to a first intake port 11 of the valve 10, and another side of the cold-side circuit 31 is connected to a second exhaust port 14 of the valve 10.

Figure 3:
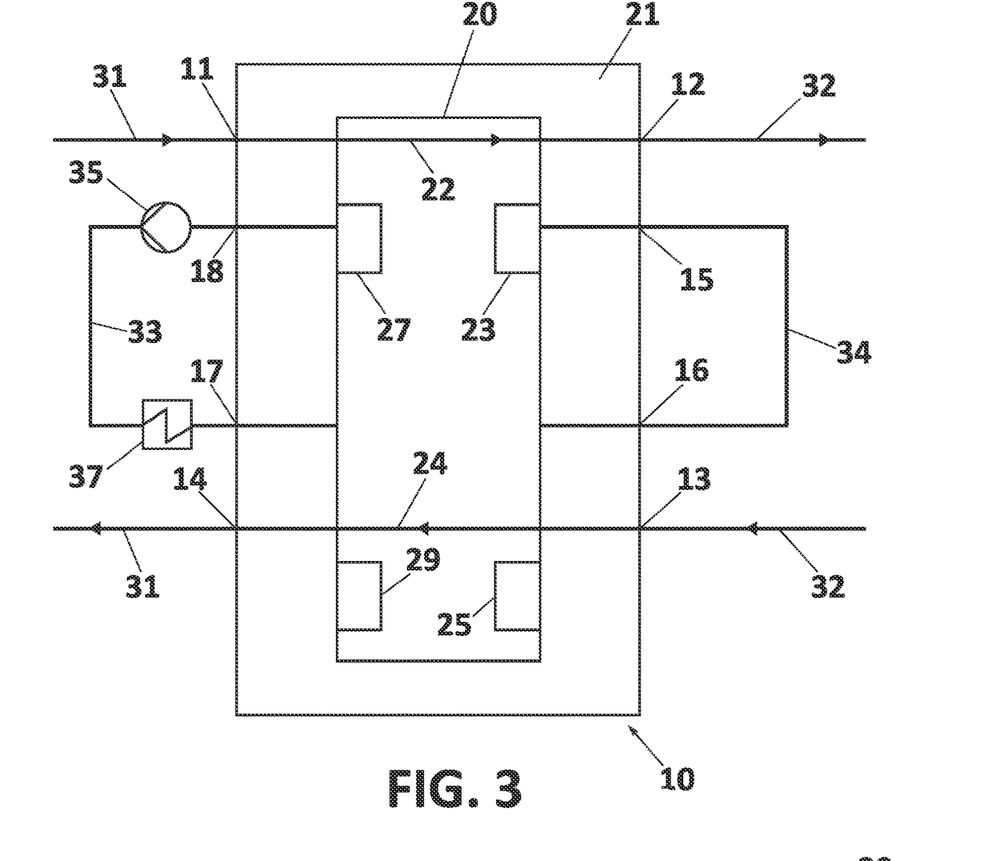
FIG. 3 is a schematic representation of a valve according to the invention mounted in a hydraulic circuit of the type and in the configuration of FIG. 2.

In a direct position, the valve is adapted to hydraulically connect:
  its first intake port 11 to its first exhaust port 12, and
  its second intake port 13 to its second exhaust port 14.

Therefore, when the valve 10 is in a direct position, the hot-side circuit 32 and the cold-side circuit 31 are connected to each other in such a way that they form a bigger hydraulic circuit 51 together.

More particularly, the valve comprises a movable part 20 mounted movable in a fixed part 21. The intake ports 11, 13, 15, 17 and exhaust ports 12, 14, 16, 18 of the valve 10 are all mounted on the fixed part 21 of the valve 10. The movable part 20 may be displaced between at least two positions with respect to the fixed part 21.

Figure 5:
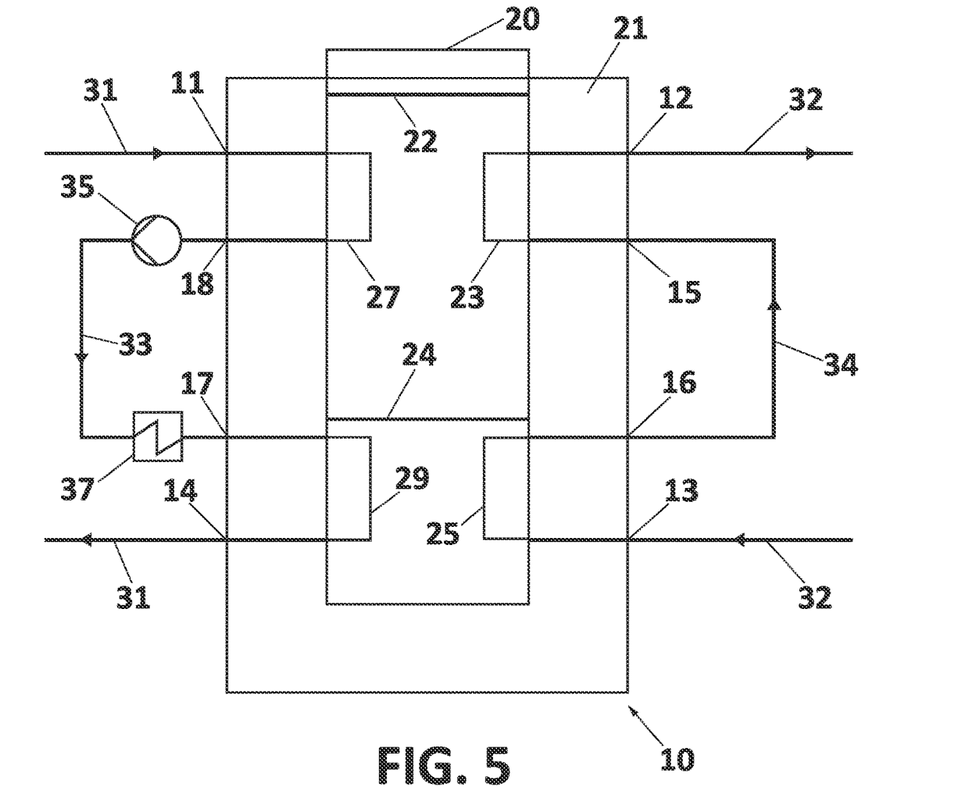
FIG. 5 is a schematic representation of a valve according to FIG. 3 and mounted in a hydraulic circuit of the type and in the configuration of FIG. 4.

The movable part 20 may be in a first position, called a direct position, represented in FIGS. 2 and 3 with respect to the fixed part 21, or in a second position, called a bypass position, represented in FIGS. 4 and 5, with respect to the fixed part 21.

The movable part 20 may be displaced by any type of actuator such as electrical, hydraulic, pneumatic, etc.

In the direct position of the valve:
  the first intake port 11 is hydraulically connected to the first exhaust port 12 by a first passageway 22, and
  the second intake port 13 is hydraulically connected to the second exhaust port 14 by a second passageway 24, This configuration corresponds to a functioning mode in which the aircraft engine is hot and running and the coolant transports calories from the first heat exchanger 38 to the second heat exchanger 39, such that the fuel in the fuel line 42 is adequately heated up before being injected into the engine.

The hydraulic circuit 51 further comprises a third hydraulic circuit portion, called a bypass circuit 33 and a fourth hydraulic circuit portion, called a loop circuit 34.

One side of the bypass circuit 33 is connected to third exhaust port 18 of the valve 10, and another side of the bypass circuit 33 is connected to a third intake port 17 of the valve 10.

The bypass circuit 33 comprises a bypass pump 35 adapted to circulate the coolant in at least some portions of the hydraulic circuit 51. More specifically, the bypass pump is adapted to circulate the coolant in the cold-side circuit 31 and the bypass circuit 33 when they are connected together by the valve 10 in the bypass position through the third passageway and fourth passageway, and the two hydraulic circuit portions form a single hydraulic circuit (see FIGS. 4 and 5).

The bypass circuit 33 also comprises a heating device 37 such as a heat exchanger or an electrical heater adapted to heat the coolant up. This heating device 37 is used in phases of starting the engine of the aircraft. Indeed, the engine is cold at start and therefore no calories may be extracted by the first heat exchanger 38 to heat up the coolant and thus heat up the fuel at the second heat exchanger 39. Thereby, when starting the engine, the valve 10 is placed in the bypass position such that the coolant may circulate between the heating device 37 and the second heat exchanger 39 so as to heat the fuel up upon starting the engine.

The loop circuit 34 comprises a conduit connected to a fourth exhaust port 16 and a fourth intake port 15 of the valve 10 so as to close the hot-side circuit 32 on itself when the valve 10 in a bypass position (see FIGS. 4 and 5).

In other embodiments not represented, the valve may comprise an internal passageway connecting directly the second intake port 13 to the first exhaust port 12. This may be beneficial when no additional device is sought to the installed on the loop circuit 34.

In the bypass position of the valve, as represented on FIG. 5:
the first intake port 11 is hydraulically connected to a third exhaust port 18 by a third passageway 27,
a third intake port 17 is hydraulically connected to the second exhaust port 14 by a fourth passageway 29,
the second intake port 13 is hydraulically connected to a fourth exhaust port 16 by a fifth passageway 25,
a fourth intake port 15 is hydraulically connected to the first exhaust port 12 by a sixth passageway 23.

In the bypass position, while a first portion of the coolant circulates in the cold-side circuit 31 and is heated up by the heating device 37, another portion of the coolant circulates independently in the hot-side circuit 32 with the pump 36. Thereby as soon as the temperature of the engine is sufficient, the cold-side circuit 31 and the hot-side circuit 32 may be reconnected to each other by placing the valve in the direct position and all the coolant is at the required temperature in each side of the hydraulic circuit 51.

In some embodiments the loop circuit 34 may comprise a temperature sensor in order to trigger the change of position of the valve from a bypass position to a direct position. The sensor may be connected to a controller controlling an actuator of the movable part 20.

The coolant circulates in the cold-side circuit in the same direction whether the valve is in the direct position or in the bypass position. Similarly, the coolant circulates in the hot-side circuit in the same direction whether the valve is in the direct position or in the bypass position.

Figure 6:
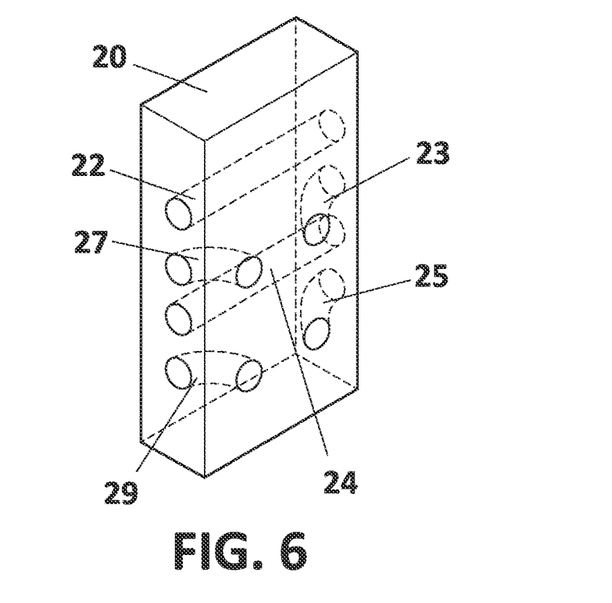
FIG. 6 is a perspective schematic representation of a movable part of a valve according to a first embodiment the invention.

In FIG. 6 a detail of an embodiment of a movable part 20 of a valve 10 of the invention is represented.

It comprises:
a first conduct 22 forming part of the first passageway in the direct position,
a second conduct 24 forming part of the second passageway in the direct position,
a third conduct 27 forming part of the third passageway in the bypass position,
a fourth conduct 29 forming part of the fourth passageway in the bypass position,
a fifth conduct 25 forming part of the fifth passageway in the bypass position,
a sixth conduct 23 forming part of the sixth passageway in the bypass position.

Figure 7:
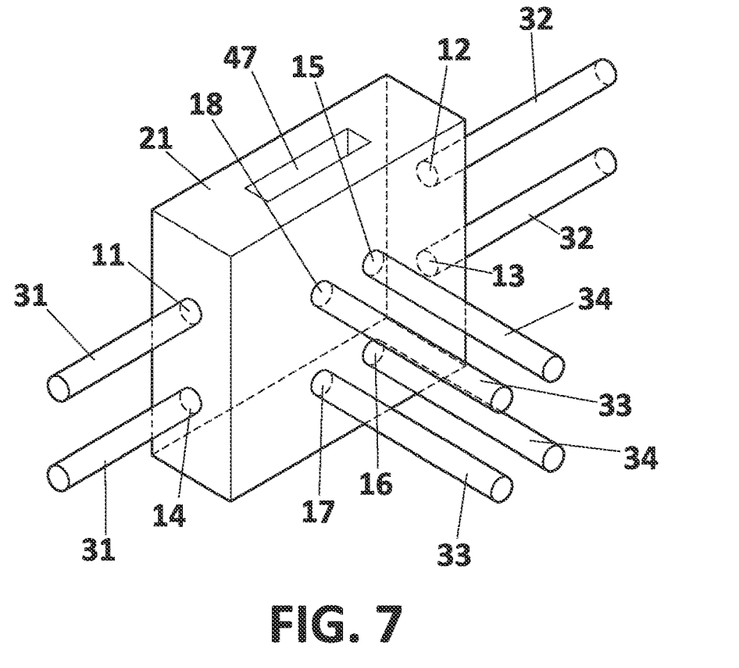
FIG. 7 is a perspective schematic representation a fixed part of a valve according to the invention which may correspond with a movable part of FIG. 6, and connected to conduits of a hydraulic circuit according to the invention.

In FIG. 7 a detail of an embodiment of a fixed part 21 of a valve 10 of the invention is represented connected to hydraulic circuit portions 31, 32, 33, 34.

The fixed part 21 comprises:
a first intake port 11 and a second exhaust port 14 connected to the cold-side circuit 31,
a second intake port 13 and a first exhaust port 12 connected to the hot-side circuit 32,
a third intake port 17 and a third exhaust port 18 connected to the bypass circuit 33,
a fourth intake port 15 and a fourth exhaust port 16 connected to the loop circuit 34.

Figure 8:
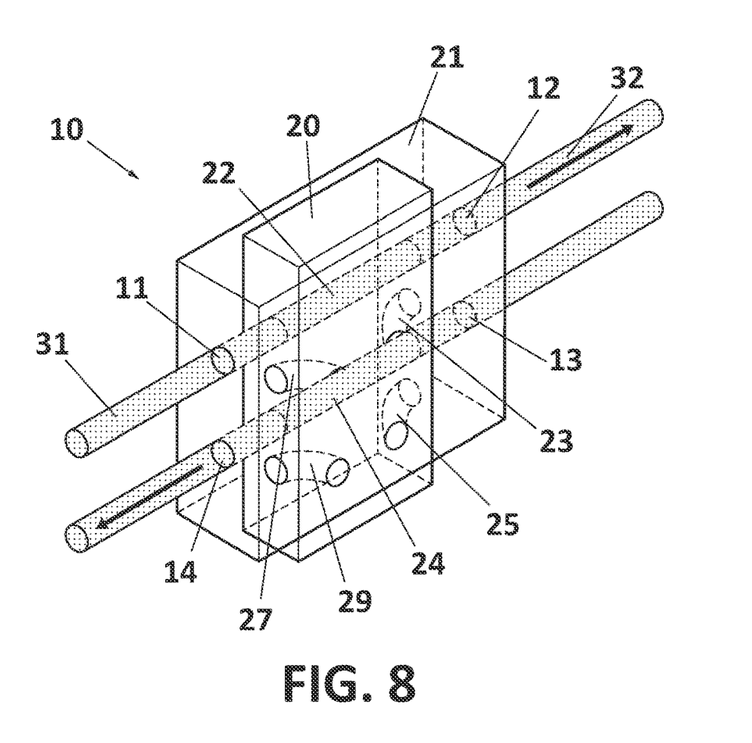
FIG. 8 is a perspective schematic representation of a valve with parts corresponding to FIGS. 6 and 7 in a direct position.
Figure 9:
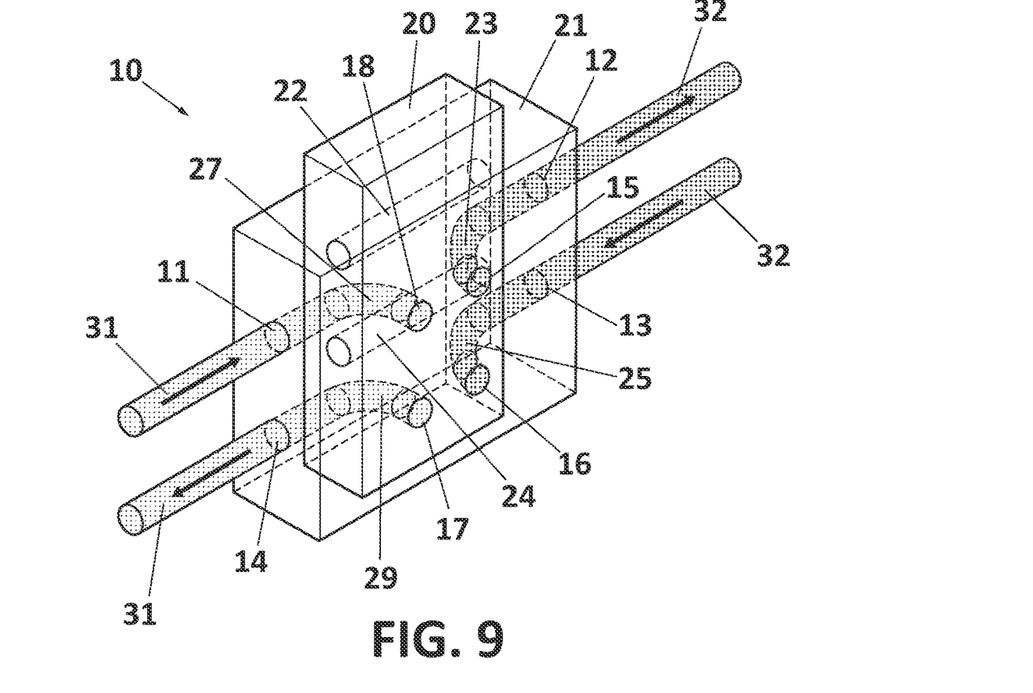
FIG. 9 is a perspective schematic representation of a valve corresponding to FIG. 8 in a bypass position.

Moreover, the fixed part 21 comprises a recess 47 for the movable part 20. The movable part may slide in translation in this recess 47. In the representations of FIGS. 8 and 9, the movable part 20 may slide vertically with respect to the fixed part 21 between the direct position represented in FIG. 8 and the bypass position represented in FIG. 9.

As represented in FIG. 8, the fixed part 21 comprises conduit portions between the intake ports and exhaust ports and the recess 47 so as to connect the intake ports and exhaust ports to respective conduits 22, 24, 27, 29, 25, 23 of the movable part 20. In FIG. 8, the valve 10 is represented in a direct position in which the coolant is circulating from the cold-side circuit 31 to the hot-side circuit 32 through the first passageway 22 and from the hot-side circuit 32 to the cold-side circuit 31 through the second passageway 24, where the arrows represent the flow direction of the coolant in the hydraulic circuit 51.

In FIG. 9 on the contrary, the valve 10 is represented in a bypass position in which the coolant is circulating independently in two hydraulic circuits, where the arrows represent the flow direction of the coolant in the two hydraulic circuits:
in a first circuit from the cold-side circuit 31 to the bypass circuit 33 through the third passageway 27 and back to the cold-side circuit 31 through the fourth passageway 29;
in a second circuit from the hot-side circuit 32 to the loop circuit 34 through the fifth passageway 25, and back to the hot-side circuit 32 through the sixth passageway 23.

Figure 10:
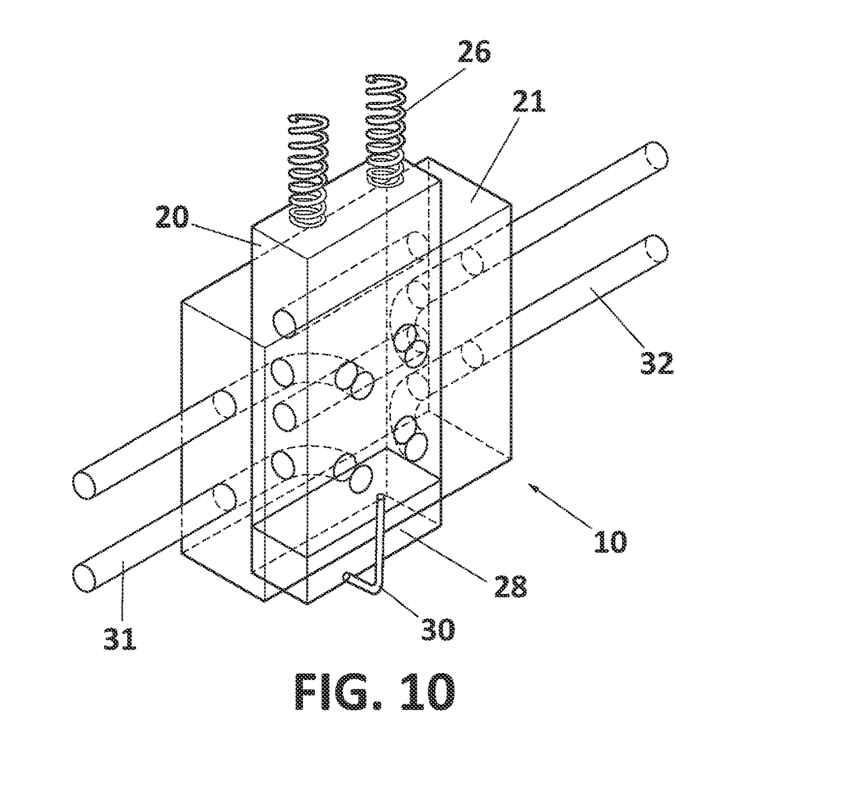
FIG. 10 is a perspective schematic representation of a detail of a valve according to the invention with specific emphasis on the actuation of the movable part.

In FIG. 10, an example of a valve according to the invention is schematically represented with a focus on the actuation of the movable part 20. In this embodiment the movable part is movable in translation with respect to the fixed part 21. In particular a specific embodiment of actuation of the movable part 20 is represented.

In this embodiment, the valve 10 comprises a piston chamber 28 and a hydraulic actuating conduit 30. The piston chamber 28 is adapted to receive a fluid with a low compressibility. The piston chamber 28 is formed within the fixed part 21 of the valve, with one face closed by the movable part 20. Upon injection of a low-compressibility fluid in the piston chamber 28, the movable part is displaced with respect to the fixed part.

Moreover, the valve 10 may comprise a device to maintain the movable part in the direct position by default. In this example the valve comprises a pair of springs 26 which may rest against a portion of the fixed part 21 on one side (not shown), and on a face of the movable part 20 on another side such that in the absence of a pressurized fluid in the piston chamber 28, the movable part 20 is maintained in the direct position.

When such valve 10 is mounted in a hydraulic circuit 51 of the type presented in FIGS. 1, 2 and 4, the injection of pressurized fluid in the piston chamber 28 through the hydraulic actuating conduit 30 is beneficially controlled simultaneously or slightly in advance to the actuation of the bypass pump 35.

In some embodiments, the bypass pump 35 may be used to both circulate the coolant in the bypass circuit 33 and be connected to the hydraulic actuating conduit 30 to inject/pressurize a fluid in the piston chamber 28 of the valve 10. Thereby the valve is actuated from a direct position to a bypass position simultaneously to the circulation of coolant in the bypass circuit 33; this latter being connected to the cold-side circuit 31 as soon as the movable part 20 is in the bypass position.

Figure 11A:
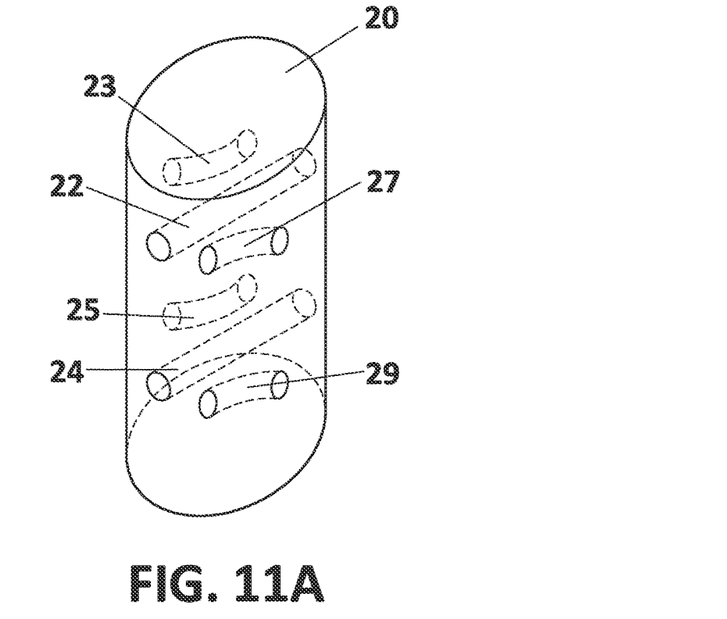
FIG. 11A is a perspective schematic representation of a movable part of a valve according to a second embodiment the invention.

In FIG. 11A an alternative embodiment of a movable part 20 according to the invention is represented. In this embodiment, the movable part 20 is cylindrical and may be mounted in a rotatable manner around an axis 49 within a cylindrical recess of the fixed part. In such embodiment, the movable part 20 would rotate between its direct position and its bypass position.

Similarly to previous embodiments, the movable part 20 comprises multiple conduits 22, 24, 23, 25, 27, 29 for connecting intake ports to exhaust ports in at least two different configurations corresponding to the direct position and the bypass position.

Figure 11B:
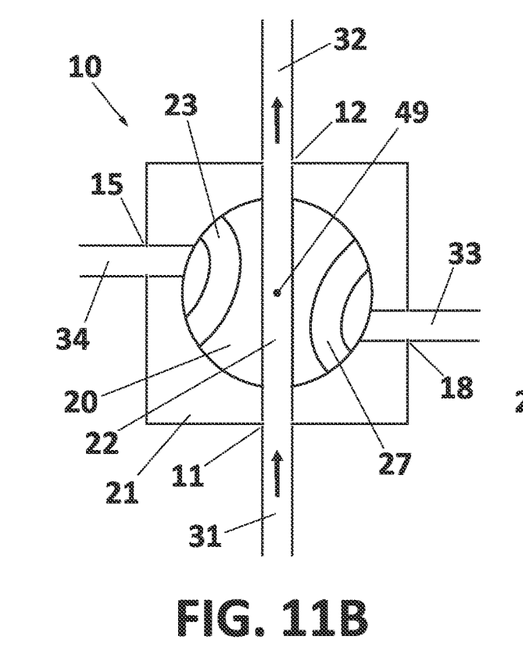
FIG. 11B is a cross-section view of a valve in an embodiment of the type of FIG. 11A in a direct position.
Figure 11C:
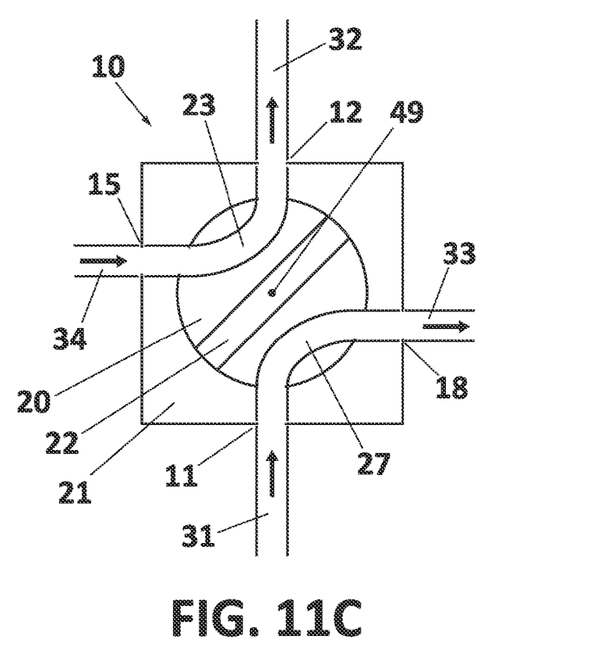
FIG. 11C is a cross-section view of the valve embodiment of FIG. 11B in a bypass position.

In FIGS. 11B and 11C a cross section by a horizontal plane of this movable part 20 as mounted in a fixed part 21 is represented. The cross-section is represented at the height of a plane comprising multiple conduits 22, 23, 27.

In FIG. 11B, the movable part 20 is in a direct position in which it connects a cold-side circuit 31 with a hot-side circuit 32 through a first intake port 11, a first passageway comprising a first conduit 22, and through a first exhaust port 12. A bypass circuit 33 and a loop circuit 34 are cut and not used in this direct position.

By a clock-wise rotation of the movable part 20 in the fixed part 21 around an axis 49, the valve 10 is switched from a direct position to a bypass position.

In the bypass position represented in FIG. 11C, the valve 10 is in a bypass position in which it connects:
the cold-side circuit 31 with the bypass circuit 33 through the first intake port 11, a third passageway comprising a third conduit 27, and through a third exhaust port 18,
the loop circuit 34 with the hot-side circuit 32 through a fourth intake port 15, a sixth passageway comprising a sixth conduit 23, and through the first exhaust port 12.

Figure 12:
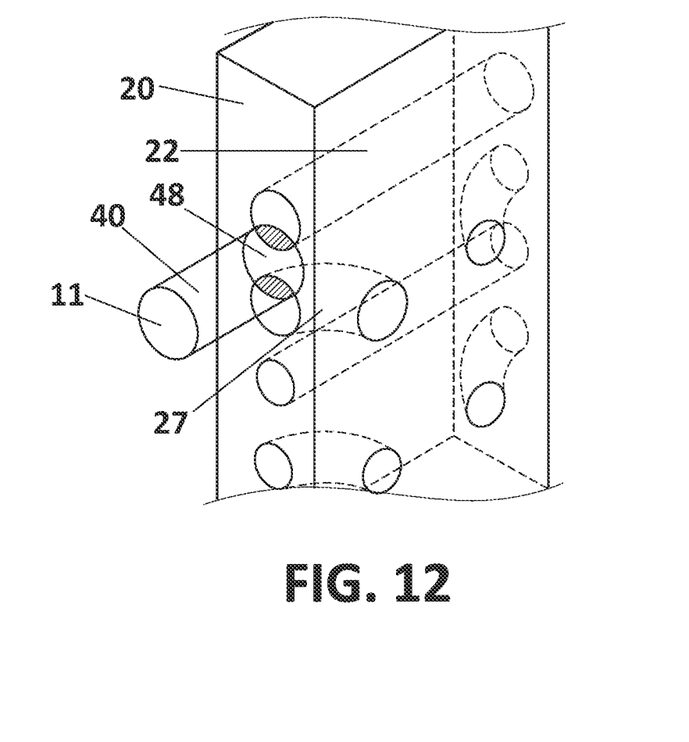
FIG. 12 is a perspective schematic representation of a detail of a valve according to the invention with specific emphasis on the conduits of the movable part and the fixed part.

In FIG. 12, a detail of a valve according to the invention is shown. The valve comprises a conduit 40 extending within the fixed part 21 from the first intake port 11 to an opening 48 on the recess in which the movable part 20 is mounted. The movable part 20 comprises multiple conduits comprising at least a first conduit 22 for forming the first passageway in the direct position between the first intake port 11 and the first exhaust port, and a third conduit 27 for forming the third passageway in the bypass position between the first intake port 11 and the third exhaust port.

In this FIG. 12, the movable part 20 is between the direct position and the bypass position. The diameters of the conduit 40, the first conduit 22 and the third conduit 27, and the distances between the first conduit 22 and the third conduit 27 are such that the opening 48 of the conduit 40 overlaps the first conduit 22 and the third conduit 27. Thereby, by applying the same feature to all hydraulic connections within the valve between conduits of the fixed part and conduits of the movable part, when the movable part 20 is displaced between the direct position and the bypass position, the fluid in the hydraulic circuits is never stopped. Any hammer effect in the hydraulic circuit(s) or any other unstable system performance during or after the position change of the valve are thus avoided.

Figure 13:
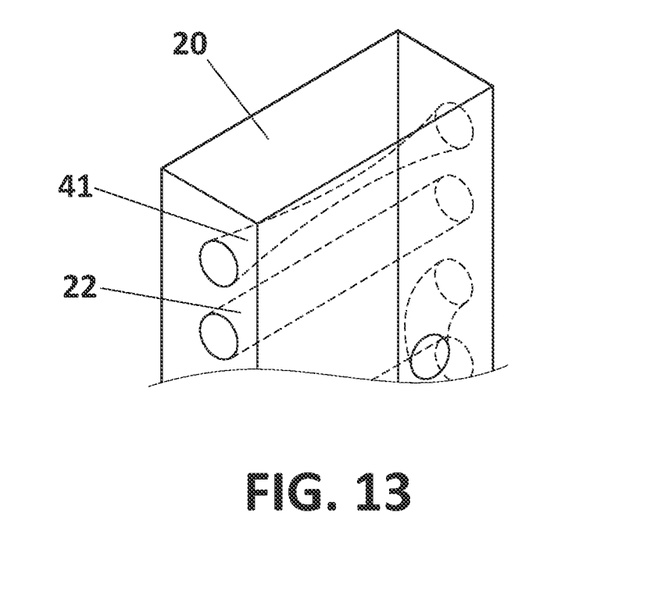
FIG. 13 is a perspective schematic representation of a detail of a movable part of a valve according to the invention with specific emphasis on particular conduits of the movable part.

In FIG. 13, a detail of a valve according to the invention is shown. The valve comprises a conduit 41 to connect an intake port to an exhaust port. The conduit 41 comprises a restriction which allows to control the speed and debit of the fluid in the hydraulic circuit, in the corresponding position of the valve.

This conduit 41 and other ones may comprise any other functionality that one may want to add to the hydraulic circuit in a given position of the valve.

This conduit 41 may connect an intake port to an exhaust port in a third position of the movable part 20 with respect to the fixed part 21, the third position being different from the direct position and the bypass position.

A valve according to the invention thereby allows to add or remove functionalities from one or more hydraulic circuits and to easily reconfigure a hydraulic circuit with a simple displacement of a single valve.

The invention is not limited to the specific embodiments herein disclosed as examples. The invention also encompasses other embodiments within the scope of the claims but not herein explicitly described, which may comprise various combinations of the features herein described.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A valve comprising:
a first intake port,
a first exhaust port,
a second intake port,
a second exhaust port,
a movable part configured to be displaced between at least:
a first position, called a direct position, in which:
the first intake port is hydraulically connected to the first exhaust port by a first passageway, and the second intake port is hydraulically connected to the second exhaust port by a second passageway,
and a second position, called a bypass position,
a third intake port,
a third exhaust port,
wherein, with the movable part in the bypass position:
the first intake port is hydraulically connected to the third exhaust port by a third passageway, and
the third intake port is hydraulically connected to the second exhaust port by a fourth passageway
a fourth intake port,
a fourth exhaust port, and
wherein, with the movable part in bypass position:
the second intake port is hydraulically connected to the fourth exhaust port by a fifth passageway, and
the fourth intake port is hydraulically connected to the first exhaust port by a sixth passageway.

2. The valve according to claim 1, further comprising, with the movable part in the bypass position, the second intake port is hydraulically connected to the first exhaust port by at least a fifth passageway.

3. The valve according to claim 1, wherein the movable part further comprises:
a first conduit configured to form at least part of the first passageway in the direct position,
a second conduit configured to form at least part of the second passageway in the direct position,
a third conduit configured to form at least part of the third passageway in the bypass position,
a fourth conduit configured to form at least part of the fourth passageway in the bypass position.

4. The valve according to claim 1, wherein the valve is configured such that when displacing the movable part between the direct position and the bypass position, at least one passageway remains at least partially open for each intake port towards at least one exhaust port.

5. The valve according to claim 1, wherein the movable part is passively maintained in a direct position, and actively actuated towards a bypass position.

6. The valve according to claim 1, further comprising a piston chamber configured to receive a pressurized fluid to actuate the movable part.

7. The valve according to claim 1, wherein the movable part comprises a third predetermined position in which the first intake port, the second intake port, the first exhaust port and the second exhaust port may be hydraulically connected in a different manner than in the bypass position or in the direct position.

8. The valve according to claim 1, wherein the movable part comprises at least one functionalized conduit configured to modify at least one characteristic of a flow of fluid in said functionalized conduit.

9. A hydraulic circuit comprising at least one valve according to claim 1.

10. The hydraulic circuit according to claim 9, further comprising:
a first hydraulic circuit portion, called a hot-side circuit:
comprising at least one heat exchanger,
connected to the first exhaust port and to the second intake port of the valve,
a second hydraulic circuit portion, called a cold-side circuit:
comprising at least one heat exchanger,
connected to the first intake port and to the second exhaust port of the valve.

11. The hydraulic circuit according to claim 10, further comprising a third circuit portion, called a bypass circuit, comprising a bypass pump and extending between the third exhaust port of the valve and the third intake port of the valve,
wherein the valve further comprises a piston chamber configured to receive a pressurized fluid to actuate the movable part, and
wherein the hydraulic circuit further comprises a hydraulic actuating conduit extending from the bypass pump to the piston chamber of the valve.

12. The hydraulic circuit according to claim 9, further comprising a third circuit portion, called a bypass circuit, comprising a bypass pump and extending between the third exhaust port of the valve and the third intake port of the valve.

13. The hydraulic circuit according to claim 12, further comprising a heating device on the bypass circuit.

14. An aircraft comprising at least one hydraulic circuit according to claim 9.

* * * * *